United States Patent
Mania et al.

(10) Patent No.: US 9,033,587 B1
(45) Date of Patent: May 19, 2015

(54) CAGE FOR A ROLLER BEARING AND A METHOD OF MANUFACTURING THE SAME

(71) Applicant: ROLLER BEARING COMPANY OF AMERICA, INC., Oxford, CT (US)

(72) Inventors: Bogdan T. Mania, Lawrenceville, NJ (US); James Prescavage, Hainesport, NJ (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 14/167,466

(22) Filed: Jan. 29, 2014

Related U.S. Application Data

(60) Provisional application No. 61/757,895, filed on Jan. 29, 2013.

(51) Int. Cl.
*F16C 33/46* (2006.01)

(52) U.S. Cl.
CPC .................................. *F16C 33/4676* (2013.01)

(58) Field of Classification Search
CPC ............. F16C 33/4623; F16C 33/4629; F16C 33/4635; F16C 33/4641; F16C 33/4647; F16C 33/4652; F16C 33/467; F16C 33/4676
USPC .......................... 384/572, 575, 576, 578–580
See application file for complete search history.

(56) References Cited

U.S. PATENT DOCUMENTS

| | | | |
|---|---|---|---|
| 2,696,412 A | | 12/1954 | Blair |
| 2,772,128 A | * | 11/1956 | Schaeffler et al. ............ 384/580 |
| 2,883,245 A | * | 4/1959 | Anderson ..................... 384/578 |
| 2,933,803 A | | 4/1960 | Schaeffler |
| 3,051,534 A | | 8/1962 | Kohler et al. |
| 3,080,639 A | | 3/1963 | Maurizi et al. |
| 3,167,365 A | | 1/1965 | Helms |
| 3,295,899 A | | 1/1967 | Knowles et al. |
| 3,382,016 A | * | 5/1968 | Schmidt ....................... 384/575 |
| 3,494,684 A | | 2/1970 | Benson |
| 3,586,406 A | | 6/1971 | Barr |
| 3,640,594 A | | 2/1972 | Aho |
| 3,659,912 A | | 5/1972 | Scheifele |
| 3,707,753 A | * | 1/1973 | Bailey, Jr. ................. 29/898.067 |
| 3,729,239 A | | 4/1973 | Camosso |

(Continued)

FOREIGN PATENT DOCUMENTS

| | | |
|---|---|---|
| DE | 102009017598 A1 | 10/2010 |
| EP | 1803952 A1 | 7/2007 |

(Continued)

OTHER PUBLICATIONS

International Search Report from corresponding PCT Application No. PCT/US2014/013612, dated Apr. 9, 2014.

*Primary Examiner* — Phillip A Johnson
(74) *Attorney, Agent, or Firm* — MKG, LLC

(57) ABSTRACT

A cage for a roller bearing includes a first annular portion and a second annular portion opposite the first annular portion and a plurality of pillars interconnecting the first annular portion and the second annular portion. Adjacent pairs of the pillars each define a pocket for holding rollers. Each of the pockets is configured to receive at least one roller. One or more radially outward facing concave roller support surface is formed in one or more of the pillars at a position proximate a radially outer edge of the pillar. The concave roller support surface is configured to radially outwardly support a portion of one of the rollers.

18 Claims, 9 Drawing Sheets

(56) References Cited

U.S. PATENT DOCUMENTS

| | | | |
|---|---|---|---|
| 3,732,605 A | 5/1973 | Scheifele | |
| 4,952,079 A | 8/1990 | Lingner | |
| 6,086,262 A | 7/2000 | Matsumoto | |
| 6,102,579 A | 8/2000 | Kupietz | |
| 6,170,994 B1 | 1/2001 | Salter | |
| 6,196,728 B1 * | 3/2001 | Wahler et al. | 384/580 |
| 6,213,648 B1 | 4/2001 | Weidinger | |
| 6,315,459 B1 | 11/2001 | Takano et al. | |
| 6,666,584 B2 | 12/2003 | Yokota | |
| 7,670,058 B2 | 3/2010 | Schorr et al. | |
| 7,832,943 B2 | 11/2010 | Hashimoto | |
| 8,092,097 B2 | 1/2012 | Ohashi et al. | |
| 8,523,451 B2 | 9/2013 | Ozu et al. | |
| 2006/0204158 A1 | 9/2006 | Kobayashi et al. | |
| 2008/0037922 A1 | 2/2008 | Hayashi et al. | |
| 2008/0118198 A1 | 5/2008 | Tsumori et al. | |
| 2008/0285903 A1 | 11/2008 | Olsen | |
| 2009/0304317 A1 | 12/2009 | Schroeder | |
| 2010/0215297 A1 | 8/2010 | Messerschmidt et al. | |
| 2010/0310203 A1 | 12/2010 | Fandre et al. | |
| 2011/0091144 A1 | 4/2011 | Oishi et al. | |
| 2011/0229066 A1 | 9/2011 | Muhamad | |
| 2012/0207422 A1 | 8/2012 | Fukami et al. | |
| 2013/0266251 A1 | 10/2013 | Friedrich et al. | |

FOREIGN PATENT DOCUMENTS

| | | |
|---|---|---|
| JP | 2005042912 A | 2/2005 |
| JP | 2008008445 A | 1/2008 |
| WO | 9114108 A1 | 9/1991 |
| WO | 2005015038 A1 | 2/2005 |
| WO | 2006043444 A1 | 4/2006 |
| WO | 2006051857 A1 | 5/2006 |
| WO | 2007026851 A1 | 3/2007 |
| WO | 2009067980 A1 | 6/2009 |
| WO | 2009136532 A1 | 11/2009 |
| WO | 2010018663 A1 | 2/2010 |
| WO | 2011046164 A1 | 4/2011 |
| WO | 2012158087 A1 | 11/2012 |
| WO | 2013103495 A1 | 7/2013 |
| WO | 2013133363 A1 | 9/2013 |

* cited by examiner

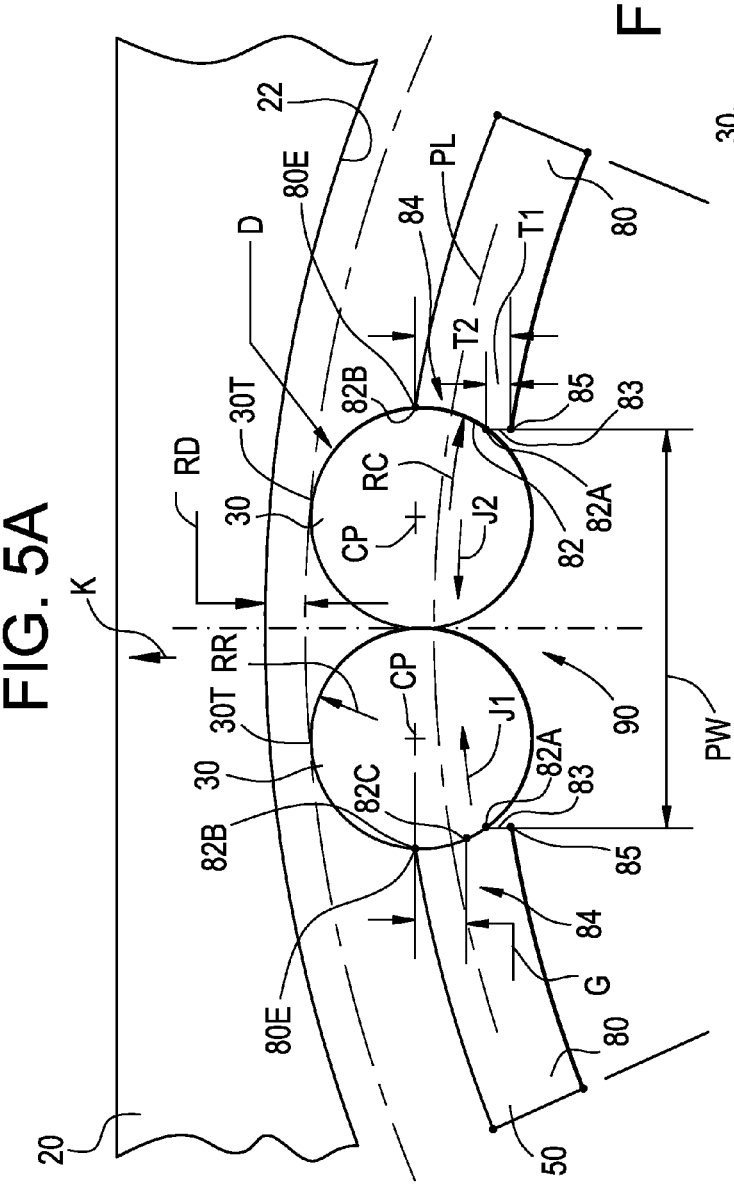
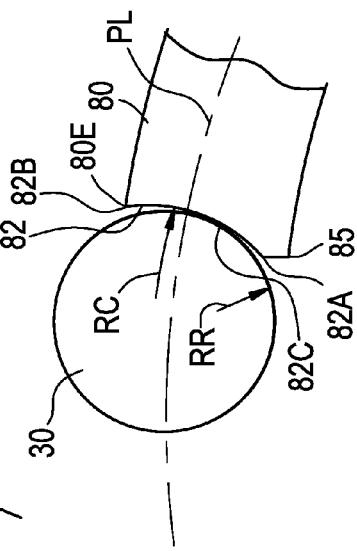

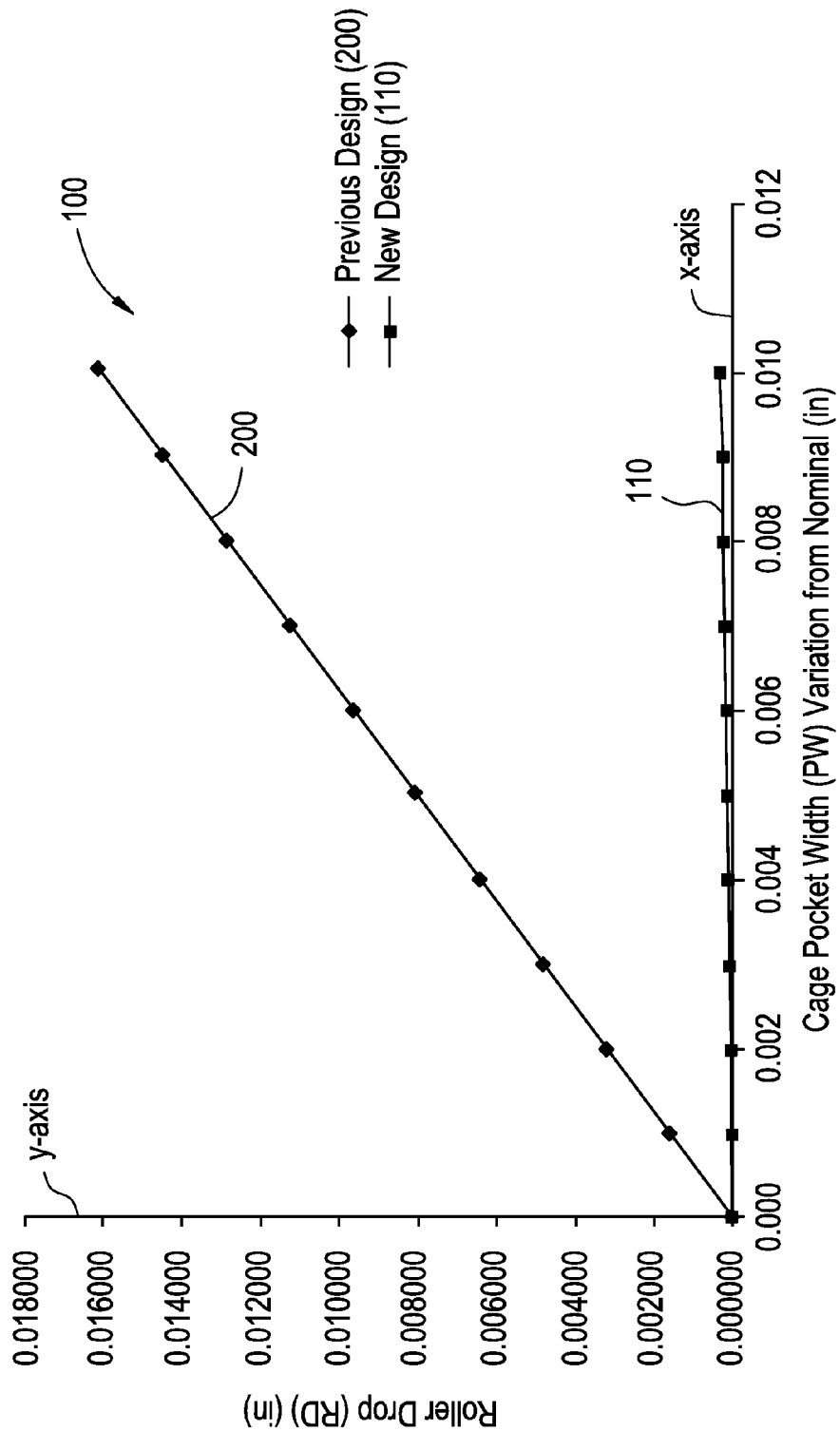

CAGE FOR A ROLLER BEARING AND A METHOD OF MANUFACTURING THE SAME

CROSS REFERENCE TO RELATED APPLICATION

This application claims the benefit of U.S. Provisional Patent Application No. 61/757,895, filed on Jan. 29, 2013, the contents of which are incorporated herein by reference in its entirety and the benefits of which are fully claimed herein.

FIELD OF THE INVENTION

The present invention is generally directed to a cage for a roller bearing and is more specifically directed to a cage having radially outward facing concave support surfaces that radially outwardly support a roller seated therein.

BACKGROUND OF THE INVENTION

Many types of bearings can be used to support radial, thrust, or combination radial and thrust loads. Such bearings include ball, roller, plain, journal, and tapered roller bearings. A needle roller bearing includes an outer ring having a generally cylindrical outer surface and a generally cylindrical inner surface defining an interior area of the outer ring. A cage is disposed in the outer ring and is rotatable relative thereto about an axis of rotation. Typically, the cage has a first annular portion and a second annular portion opposite the first annular portion. A plurality of pillars interconnects the first annular portion and the second annular portion. The plurality of pillars defines the plurality of pockets, each pocket being configured to hold one or more rollers. During operation, the rollers engage with the inner surface of the outer ring, an outer surface of the inner ring disposed therein, and the cage to facilitate rotation of the outer ring relative to the inner ring about the axis of rotation. In certain applications, the bearing does not include an inner ring. In such applications, the bearing is received on a shaft, the outer ring is rotatable relative to the shaft about the axis of rotation, and the rollers engage directly with the shaft.

The cage serves three purposes: it provides 1) retention of the rollers in the bearing, especially when there is no inner ring, 2) guidance of the rollers to keep them rolling "true" (i.e. the roller axis should be aligned with the bearing axis), and 3) separation of the rollers from rollers within the other pockets to reduce bearing friction.

Roller drop, is a measure of the retention qualities and clearance within a bearing between roller and cage. Roller drop is the radial distance between the top of a roller located at the twelve o'clock position in a vertically standing bearing, i.e. the axis of rotation is parallel to a surface on which the bearing is standing, to the inside surface of the outer ring when the bearing is at rest. A problem with known needle roller bearing designs is that roller drop can vary greatly as a function of the width of the pocket. A larger roller drop translates into more circumferential clearance between roller (s) and cage pillars. This increased clearance results in less guidance of the rollers by the cage as the bearing operates. If the width of the pocket is large enough to allow the rollers to pass through the cage pocket, retention of the rollers in the bearing by the cage is lost. As a result of the relatively wide variation of roller drop as a function of pocket width using a traditional cage design, it is known to manufacture bearing cages with relatively precise tolerances to ensure that any variation in roller drop is effectively minimized Although precision manufacturing techniques may reduce variations in roller drop, they increase the cost of manufacturing because they require precision tooling and manufacturing methods to achieve the necessary tolerances to eliminate unnecessary variation in roller drop, loss of retention, and loss of roller guidance.

SUMMARY OF THE INVENTION

According to aspects illustrated herein there is provided a cage for a roller bearing. The cage includes a first annular portion and a second annular portion opposite the first annular portion and a plurality of pillars interconnecting the first annular portion and the second annular portion. Adjacent pairs of the pillars each define a pocket for holding rollers. Each of the pockets is configured to receive at least one roller. One or more radially outward facing concave roller support surface is formed in one or more of the pillars at a position proximate a radially outer edge of the pillar. The concave roller support surface is configured to radially outwardly support a portion of one of the rollers.

According to another aspect illustrated herein there is provided a roller bearing that includes an outer ring having a substantially cylindrical internal bearing surface. The roller bearing includes a cage disposed at least partially within the outer ring. The cage includes a first annular portion (e.g., a first ring) and a second annular portion (e.g., a second ring) positioned opposite and spaced apart from the first annular portion. A plurality of pillars interconnect the first annular portion and the second annular portion to one another. Adjacent pairs of the pillars each define a pocket. One or more radially outward facing concave roller support surfaces are formed in one or more of the pillars. The radially outward facing concave roller support surfaces are positioned proximate a radially outer edge of the pillar. A plurality of rollers are disposed between the cylindrical internal bearing surface and the roller support surfaces. The radially outward facing concave roller support surface is configured to radially outwardly support at least a portion of one of the plurality of rollers.

According to another aspect illustrated herein there is provided a method of manufacturing a cage for a roller bearing. The method includes providing a cage having a first annular portion and a second annular portion opposite the first annular portion. A plurality of pillars interconnects the first annular portion and the second annular portion. The plurality of pillars defines a plurality of pockets for holding rollers. Each of the pockets is configured to receive one or more rollers, for example two rollers.

In one embodiment, each of the portions of the radially outward facing concave roller support surface defines a radially extending edge. A pocket width is defined between the radially extending edges in the pocket. When two rollers are within a pocket, the pocket width is less than two times a diameter of one of the rollers. In one embodiment, a ratio of a radially inward displacement (e.g., roller drop) of the rollers to a pocket width variation from a nominal value is less than 1.0 in/in.

DESCRIPTION OF THE DRAWINGS

FIG. 5A is a cross sectional view of a portion of the pocket of FIG. 4 taken across line 5-5;

FIG. 5B is an enlarged view of a portion of the pocket of FIG. 5A;

FIG. 9 is a graph plotting pocket width variation as a function of roller drop for the cage of FIGS. 2 and 3 and a prior art cage.

DETAILED DESCRIPTION OF THE INVENTION

Figure 1:
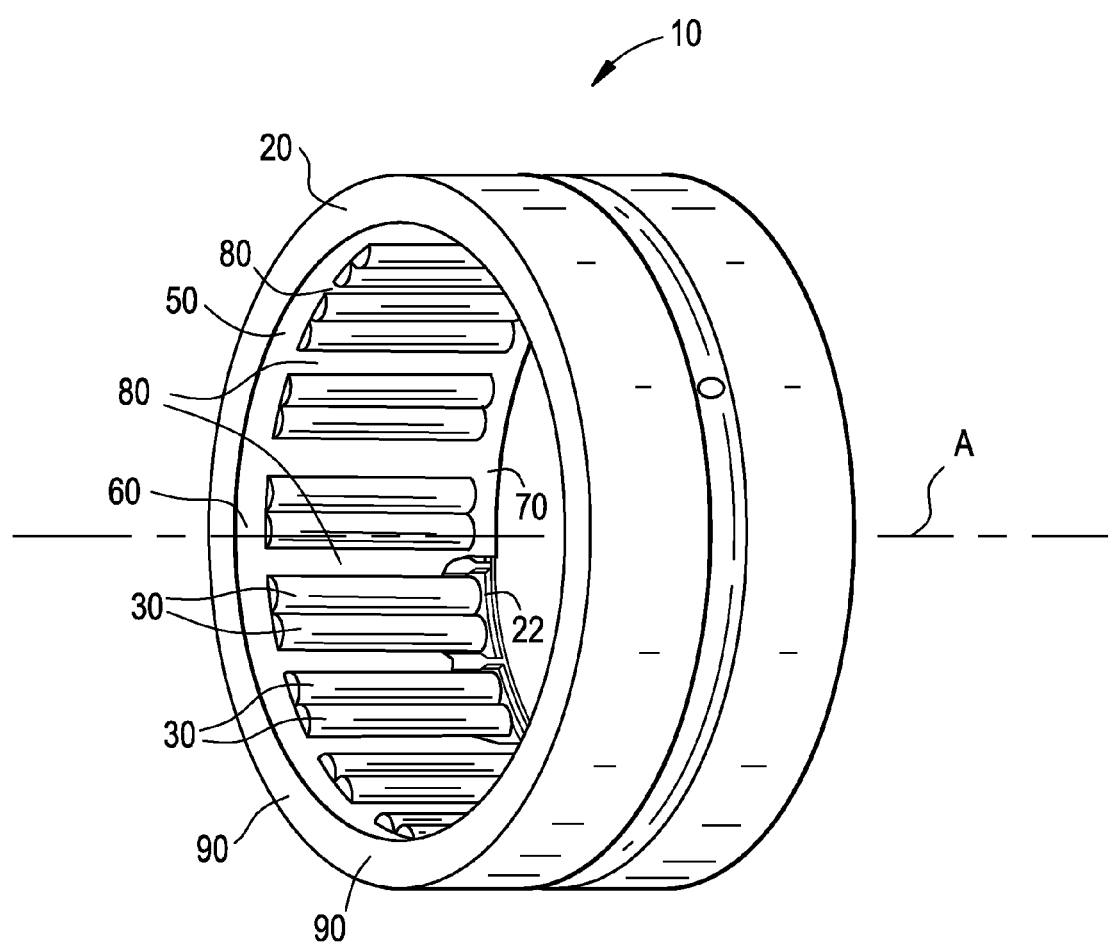
FIG. 1 is a perspective view of a roller bearing having a cage in accordance with one embodiment of the present invention.

As shown in FIG. 1, a roller bearing is generally designated by the reference numeral 10. The roller bearing 10 includes an outer ring 20 and a cage 50 disposed at least partially in the outer ring 20. The cage 50 includes a plurality of pockets 90. A plurality of rollers 30, for example needle rollers, is disposed in the outer ring 20. The cage 50 provides separation between one or more of the rollers 30. In one embodiment, an inner ring (e.g., shown in FIG. 6 as element number 126) is disposed in the outer ring 20. In one embodiment, the bearing 10 may be received directly on an axle (not shown). The inner ring or axle and the outer ring 20 are rotatable relative to one another about an axis of rotation A. The rollers 30 and the cage 50 facilitate such rotation.

The cage 50 has a first annular portion 60 (e.g., a ring) and a second annular portion 70 (e.g., another ring). A plurality of pillars 80 interconnect the first annular portion 60 and the second annular portion 70. The first annular portion 60 and the second annular portion 70 are spaced apart and parallel to one another. Each adjacent pair of the pillars 80 defines one of the pockets 90. In the embodiment disclosed in FIGS. 1-5, each pocket 90 is configured to receive two rollers 30. Thus, FIG. 1 illustrates two rollers 30 disposed in each pocket 90. It should be appreciated by a person of ordinary skill in the art and familiar with this disclosure that the present invention is not limited in this regard, and may include pockets configured to hold one roller and pockets configured to hold more than one roller.

As illustrated in FIG. 1, the plurality of rollers 30 is substantially positioned between an inside bearing surface 22 of the outer ring 20 and the cage 50. The term "substantially between" is used herein to recognize that a portion of each of the rollers 30 extends or protrudes radially inward from the cage 50 to rollingly engage an inner ring (shown in FIG. 6 as element number 126 for another bearing embodiment). However, the major portion of each of the rollers 50 rotatably positioned between the cage 50 and the inside bearing surface 22. The cage 50 is configured to retain the rollers 30 between the inside bearing surface 22 and the cage 50 and radially outwardly support the rollers, regardless of whether an inner ring or a shaft is received in the bearing 10.

Figure 2:
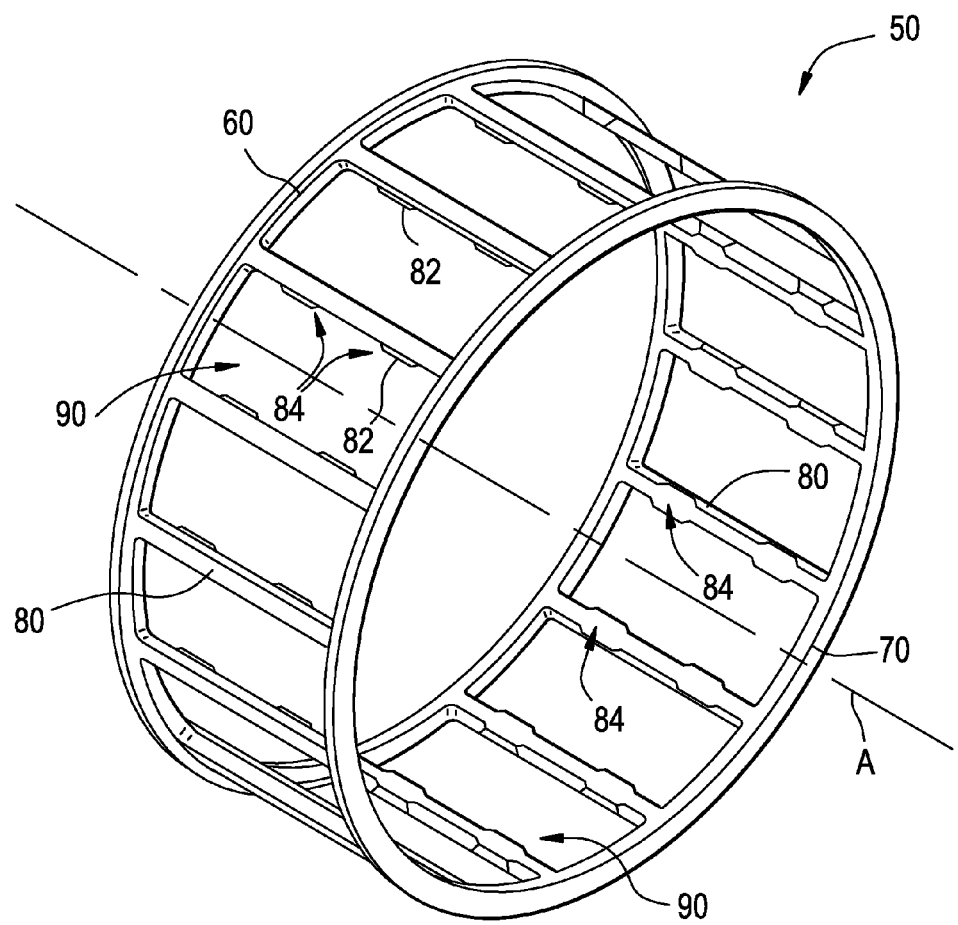
FIG. 2 is standalone perspective view of the cage shown in FIG. 1.
Figure 3:
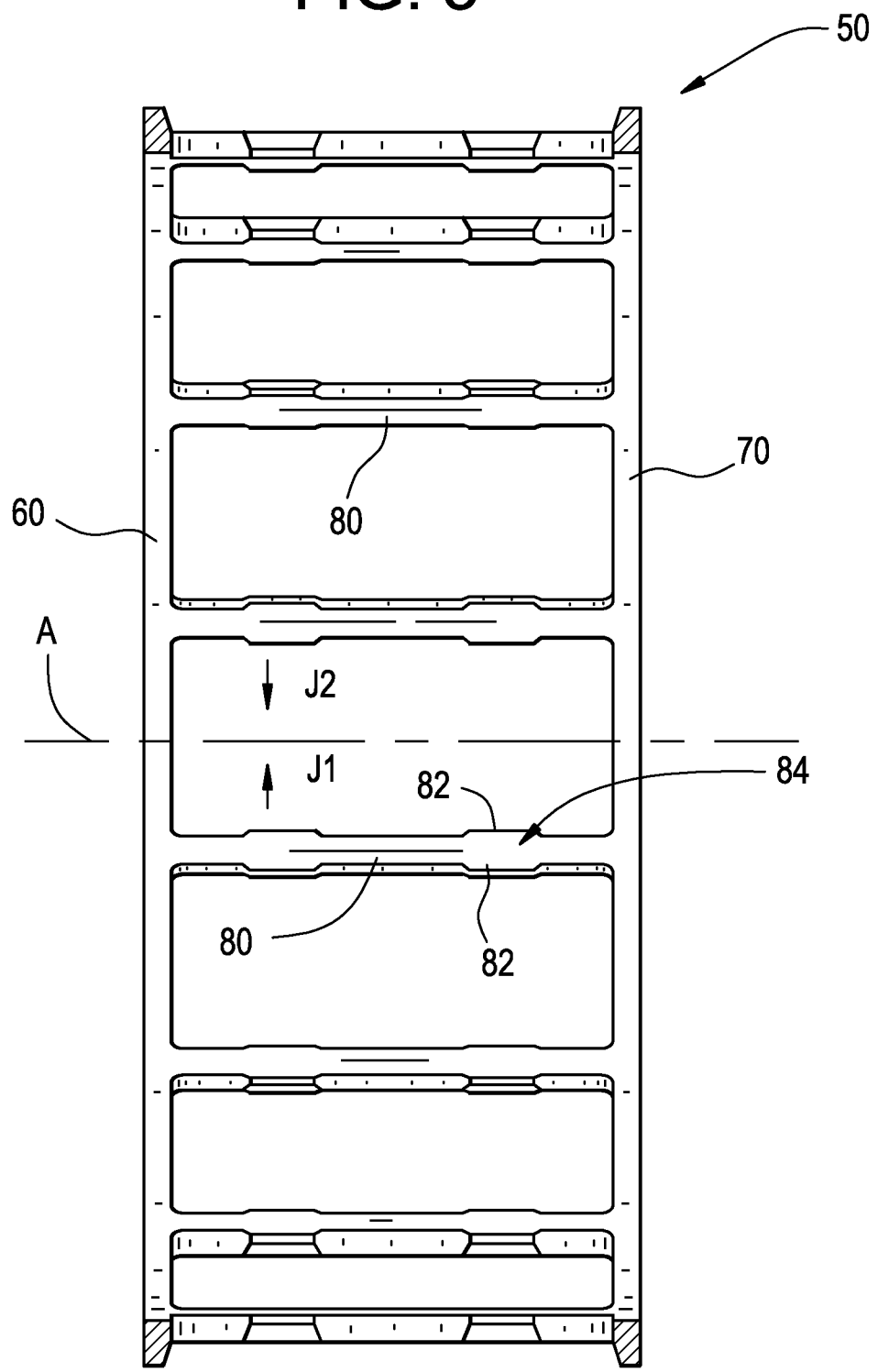
FIG. 3 is a front view of the cage of FIG. 2.
Figure 4:
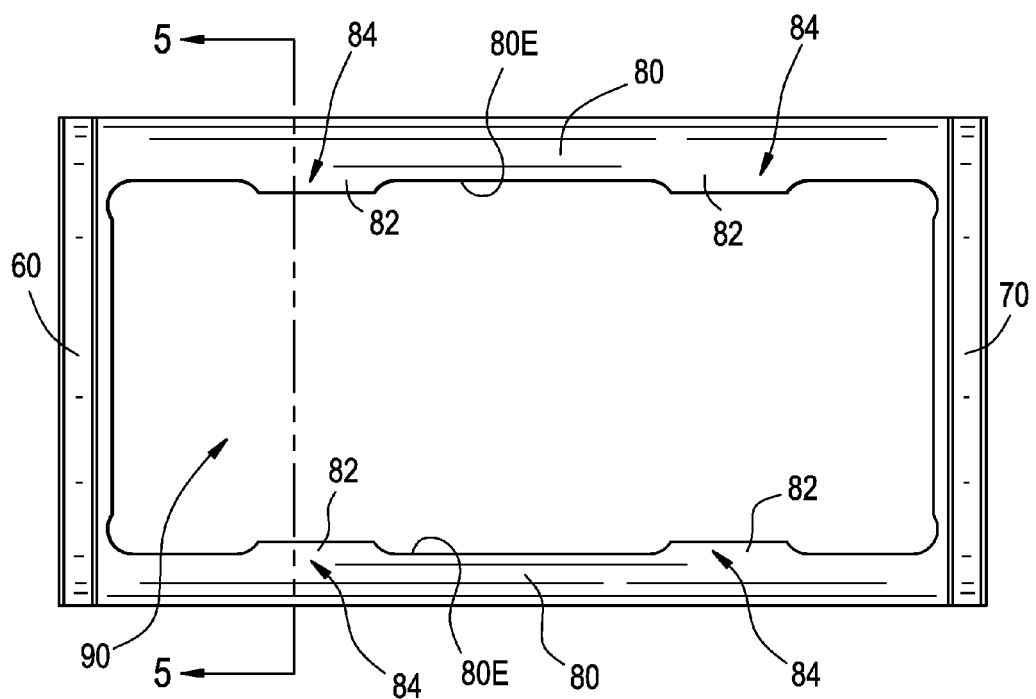
FIG. 4 an enlarged view of one pocket of the cage of FIGS. 2 and 3.

As shown in FIGS. 2-4, each pillar 80 includes at least one roller support surface 82 configured to support a roller 30. In the embodiment shown, the roller support surface 82 is formed on each of two tabs 84 that extend from a portion of each of the pillars 80 in a first circumferential direction concentric with the first annular portion 60 and the second annular portion 70, as indicated by arrow J1. The roller support surface 82 is also formed on each of two tabs 84 that extend from a portion of each of the pillars 80 in a second circumferential direction concentric with the first annular portion 60 and the second annular portion 70, as indicated by arrow J2. Thus, each pocket 90 has four tabs 84 (i.e., two pairs of tabs 84 facing each other) for supporting the rollers 30, as described further herein. It should be understood, however, that the present invention is not limited in this regard, as the roller support surface 82 may extend along the entire length of the pillar 80. In yet other embodiments, the pillar 80 may include only one tab 84 or more than two tabs 84 extending therefrom, each of the tabs 84 defining a roller support surface.

In reference to FIGS. 2-4, each of the pockets 90 are defined by two of the pillars 80. Two rollers 30 (e.g., needle rollers) are received in each of the pockets 90, as shown in FIG. 1. The rollers 30 are supported by roller support surfaces 82. The roller support surfaces 82 cooperate with the rollers 30 and an inside bearing surface 22 of the outer ring 20 to retain rolling elements 30 in the pocket 90 in an assembled bearing 10.

In reference to FIGS. 5A and 5B, the roller support surfaces 82 have a concave cross section along an axis parallel to the axis of rotation A (axis A shown in FIGS. 1-3). As shown in FIGS. 5A and 5B, the radius of curvature RC of the roller support surfaces 82 are greater than or equal to a radius of curvature RR of the rollers 30. The roller support surfaces 82 conform to the shape of a roller 30 adjacent thereto and radially outwardly support the roller 30 by engaging a portion thereof. The concave configuration of the roller support surfaces 82 result in increased contact area between roller 30 and cage 50 and reduces surface stress of the rollers 30 and the cage 50 and reduces wear thereof.

Referring to FIG. 5A, the roller support surfaces 82 are radially outward facing in the general direction of the arrow K. The roller support surfaces 82 of adjacent pillars 80 face towards each other as indicated by arrows J1 and J2. The roller support surfaces 82 define a radially outermost end 82B that coincides with a radially outer edge 80E of the pillar 80. The roller support surfaces 82 extend from the outermost end 82B in an arcuate manner to a junction 82A with a generally straight surface 83 formed on a circumferentially facing edge of the tab 84. The straight surface 83 extends radially between the junction 82A and a radially inward positioned terminus 85. The straight surfaces 83 of adjacent tabs 84 face each other and are parallel to one another. A pocket width PW is defined between the straight surfaces 83 of adjacent tabs 84. In one embodiment, the pocket width PW is less than two times a diameter D of the rollers 30.

Still referring to FIG. 5A, a roller pitch line PL is defined as the line that the center CP of the rollers 30 follow as the rollers 30 roll around the bearing 10 when the rollers 30 are positioned therein. Each of the rollers 30 rollingly contacts the roller support surfaces 82 at a center-point CP of contact. The center-point CP of contact has an initial width in an unloaded condition and a wider width when the rollers 30 are loaded. The center-point CP of contact is positioned radially inward from the pitch line PL and the outermost end 82B. The center-point CP of contact is positioned radially outward from the junction 82A.

As shown in FIG. 5A, roller drop RD (i.e., radially inward displacement of the rollers 30) is defined herein as a distance between the inside bearing surface 22 of the outer ring 20 and a radially outermost portion 30T of the roller 30. The inventors have discovered that the concave roller support surfaces 82 of the present invention reduce the variation in roller drop RD as a function of pocket width PW, as illustrated graphically in FIG. 9, compared to prior art cages.

The inventors have conducted significant analysis, experimentation and prototype testing in an effort to reduce the amount of roller drop with variation in pocket width PW. Portions of the results of the analysis, experimentation and testing is illustrated graphically in FIG. 9. As shown in FIG. 9a graph 100 of roller drop RD versus variation of pocket width PW is plotted for the present cage 10 (line 110) and a prior art cage (line 200). In particular, the graph 100 includes roller drop RD in inches on a Y-axis and pocket width PW variation on an X-axis in increments of +0.001 from a nominal value. Pocket width PW variation is a suitable variable to analyze and plot because manufacturing tolerances result in variations in actual pocket width PW. A ratio RR of roller drop to pocket width PW variation from a nominal value is defined by a slope of the line 110 or 200 and represented by the equation:

$$RR = (\text{change in roller drop } RD \div \text{change in } PW \text{ variation}) \quad \text{Eq. 1}$$

Smaller magnitudes of the ratio RR represent an improvement over ratios RR of greater magnitudes because less precision in manufacturing and forming the pocket width PW are required to obtain the same or lesser amounts of roller drop RR. As illustrated in the graph 100 of FIG. 9, the line 110 for the cage 50 of the present invention has a slope or ratio RR of less than 1.0, for example a slope of about 0.0227 in/in is shown in the line 110 of FIG. 9. The line 200 for prior art cages is has a slope or ratio RR of about 1.616 in/in. Data points for the line 110 and the line 200 of the graph 100 of FIG. 9 are presented in Table 1 below.

TABLE 1

| Pocket Width (PW) Variation (in) | Roller Drop (RD) Prior Art Cage Line 200 (in) | Roller Drop (RD) Cage 50 of present invention Line 110 (in) |
| --- | --- | --- |
| 0.000 | 0.000000 | 0.000000 |
| 0.001 | 0.001615 | 0.000033 |
| 0.002 | 0.003231 | 0.000067 |
| 0.003 | 0.004846 | 0.000101 |
| 0.004 | 0.006462 | 0.000135 |
| 0.005 | 0.008077 | 0.000171 |
| 0.006 | 0.009693 | 0.000207 |
| 0.007 | 0.011309 | 0.000243 |
| 0.008 | 0.012924 | 0.000280 |
| 0.009 | 0.014540 | 0.000318 |
| 0.010 | 0.016156 | 0.000356 |
| Slope RR (Eq. 1) | 1.616 in/in | 0.0227 in/in |

As a result of the reduced variation in roller drop RD with the cage 50 in accordance with the present invention, it is possible to manufacture the cage with less precise tolerances while still meeting the same performance benchmarks associated with roller drop RD, thereby reducing the cost of manufacture. In the embodiment shown, the cage 50 is manufactured from a low alloy steel. Although a specific material is disclosed herein, a person of ordinary skill in the art and familiar with this disclosure will understand that the present invention is not limited in this regard, and that other materials may be used with the present invention.

In addition to the above described advantages of reducing roller drop, it has been discovered that a bearing in accordance with the present invention facilitates installation of rollers, and similarly facilitates inspection of the same. For example, referring to FIG. 5, dimensional inspection of the location of the concave roller support surfaces 82 is accomplished by measuring a distance T1 between the junction 82A and the terminus 85; and measuring a distance T2 between the radially outermost end 82B and the terminus 85. Installation of the rollers 30 in the pockets 90 is facilitated by reduced amount of roller drop RD as a function of pocket width PW and the pocket width PW variation throughout the entire cage 50 is more consistent than prior art cages. Thus the rollers 30 are retained by the cage in a more uniform manner resulting in easier assembly of the bearing 10, cage 50 and rollers 30, compared to prior art bearings.

Figure 8:
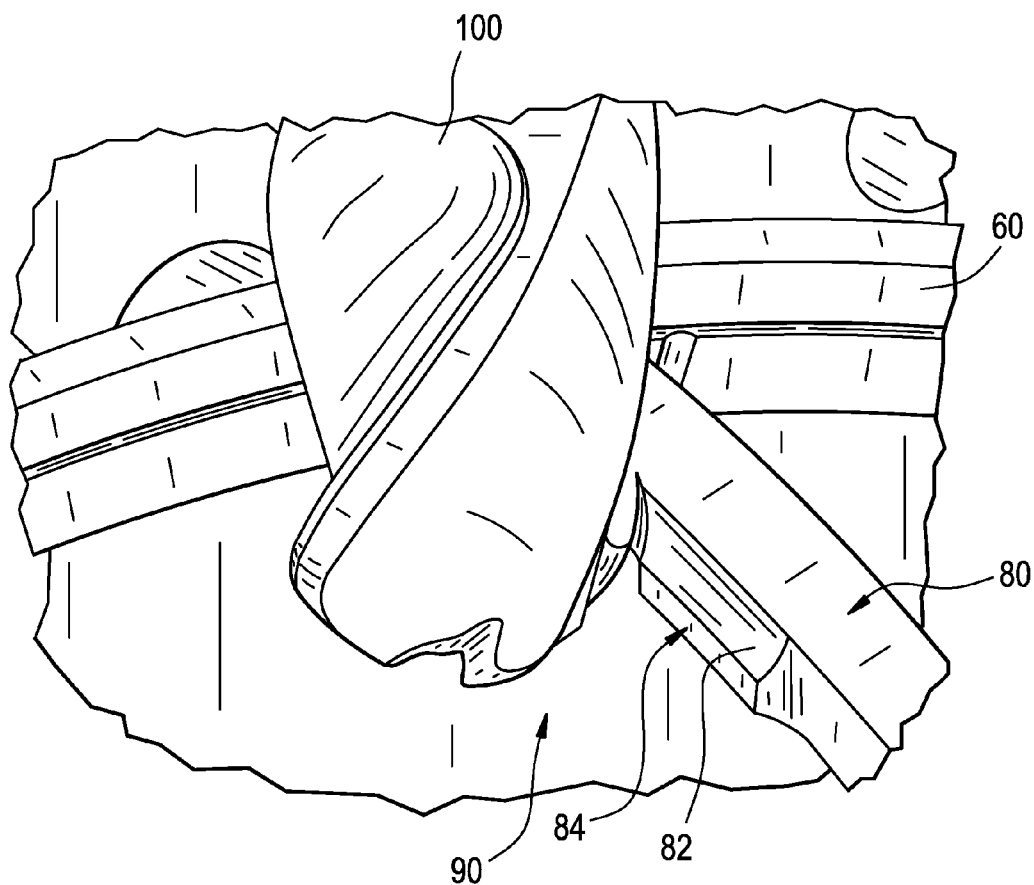
FIG. 8 is a perspective view of a pillar of the cage of FIGS. 2 and 3 and showing a cutting tool proximate thereto.

In reference to FIG. 8, a method of manufacturing a cage 50 for a bearing 10 in accordance with one embodiment of the present invention is shown. A spherical end mill 100 is used to form the concave roller support surface 82 on an outside surface of the tab 84. The spherical end mill 100 cuts the concave roller support surface 82 in at least a portion of the tab 84 extending from the pillar 80. Although a spherical end mill 100 is shown as forming the roller support surface 82, the present invention is not limited in this regard, as other methods may be employed to achieve the concave surface.

Figure 6:
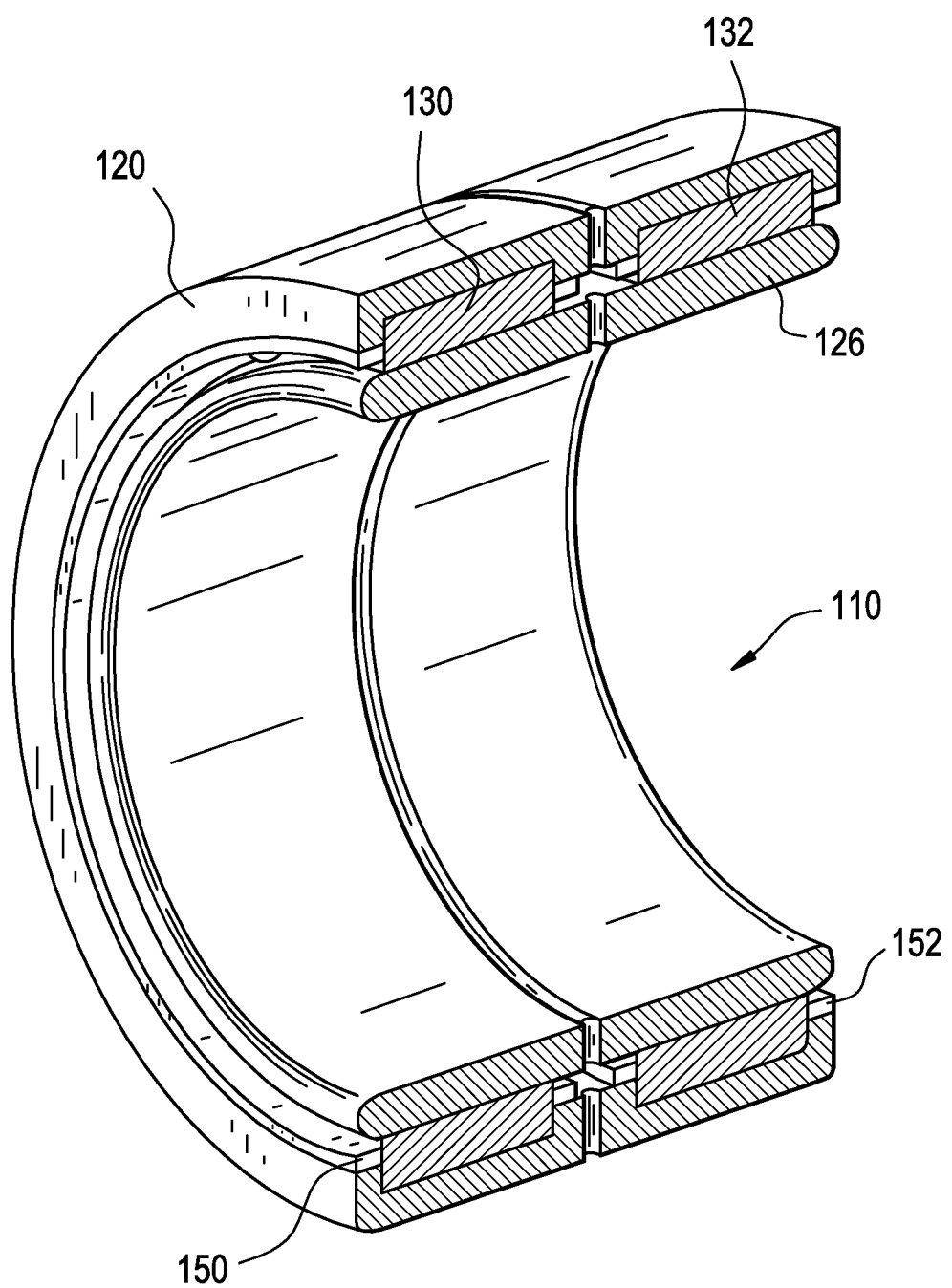
FIG. 6 is a cross sectional perspective view of a double row needle bearing that is configured to receive the cage of FIGS. 2 and 3.
Figure 7:
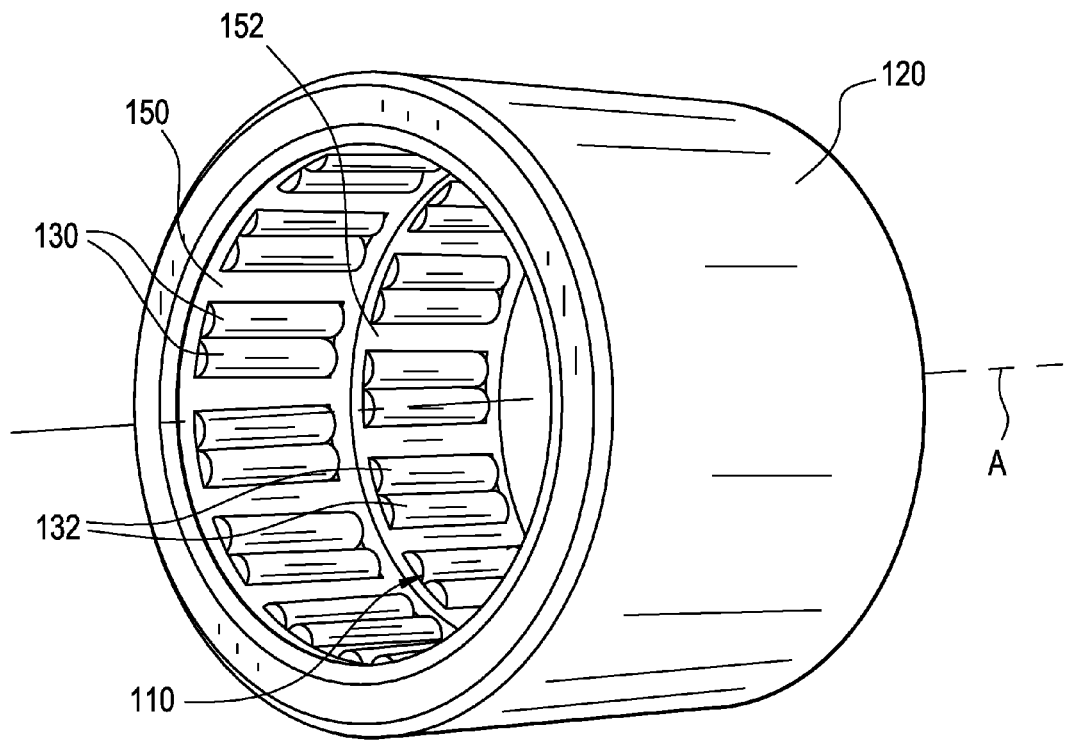
FIG. 7 is a perspective view of the double row bearing of FIG. 6 shown with the inner ring removed.

In reference to FIGS. 6 and 7, another embodiment 110 of the present invention is shown in which the bearing 110 has two rows of the rollers 130, 132 and in which an inner ring 126 is disposed in an outer ring 120. A first cage 150 disposed at least partially between the outer ring 120 and the inner ring 126. A second cage 152 is disposed at least partially between the outer ring 120 and the inner ring 126 and is adjacent to the first cage 150. A first plurality of rollers 130, for example needle rollers, is disposed between the outer ring 120 and the inner ring 126 defining a first row of rollers. A second plurality of rollers 132, for example needle rollers, is disposed between the outer ring 120 and the inner ring 126, defining a second row of rollers. The cages 150, 152 provide separation between one or more of the rollers in the first row 130 and the second row 132, respectively. The inner ring 126 is rotatable relative to the outer ring 120 about an axis of rotation A. The rollers 130, 132 and the cage 150, 152 facilitate rotation of the outer ring 120 relative to the inner ring 126. It should be understood that although a bearing 110 with an inner ring 126 is disclosed in FIG. 5, the present invention is not limited in this regard, as a person having ordinary skill in the art and familiar with this disclosure will appreciate that the bearing in accordance with the present invention may be received on a shaft or the like such that the rollers engage directly with an outside surface thereof.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cage for a roller bearing comprising:
    a first annular portion and a second annular portion opposite the first annular portion;
    a plurality of pillars interconnecting the first annular portion and the second annular portion;
    adjacent pairs of the plurality of pillars each defining a pocket for holding rollers, each of the pockets being configured to receive at least one roller;
    at least one radially outward facing concave roller support surface formed in at least one of the plurality of pillars and proximate a radially outer edge of the pillar, the concave roller support surface being configured to radially outwardly support at least a portion of one of the rollers;

a portion of the radially outward facing concave roller support surface of each adjacent pair of pillars face towards each other; and each of the portions of the radially outward facing concave roller support surface defines a radially extending edge and a pocket width is defined between the radially extending edges in the pocket, the pocket width being less than two times a diameter of one of the rollers.

2. The cage of claim 1, wherein at least one of the plurality of pockets is configured to receive two of the rollers.

3. The cage of claim 1, wherein the radially outward facing concave roller support surface has a radius of curvature that is greater than or equal to a radius of curvature of the rollers.

4. The cage of claim 1, wherein at least one of the pillars defines a tab extending in a circumferential direction concentric with the first annular portion and the second annular portion.

5. The cage of claim 4, wherein at least one of the tabs has the radially outward facing concave roller support surface formed therein.

6. The cage of claim 1, wherein each of the pillars defines at least two tabs extending in a first common circumferential direction concentric with the first annular portion and the second annular portion.

7. The cage of claim 6, wherein each of the pillars defines at least two additional tabs extending in a second common circumferential direction concentric with the first annular portion and the second annular portion, the second common circumferential direction being opposite the first common circumferential direction.

8. The cage of claim 1, wherein a ratio of pocket width variation from a nominal value to a radially inward displacement of the rollers is less than 1.0.

9. A roller bearing, comprising:
an outer ring having a substantially cylindrical internal bearing surface;
a cage disposed at least partially within the outer ring, the cage comprising:
a first annular portion and a second annular portion opposite the first annular portion;
a plurality of pillars interconnecting the first annular portion and the second annular portion;
adjacent pairs of the plurality of pillars each define a pocket;
at least one radially outward facing concave roller support surface formed in at least one of the plurality of pillars and proximate a radially outer edge of the pillar;
a plurality of rollers disposed between the cylindrical internal bearing surface and the radially outward facing concave roller support surface;
the radially outward facing concave roller support surface being configured to radially outwardly support at least a portion of one of the plurality of rollers;

a portion of the radially outward facing concave roller support surface of each adjacent pair of pillars face towards each other; and each of the portions of the radially outward facing concave roller support surface defines a radially extending edge and a pocket width is defined between the radially extending edges in the pocket, the pocket width being less than two times a diameter of one of the rollers.

10. The roller bearing of claim 9, wherein at least two of the plurality of rollers are disposed in each of the pockets.

11. The roller bearing of claim 9, wherein the radially outward facing concave roller support surface has a radius of curvature that is greater than or equal to a radius of curvature of any one of the plurality of rollers.

12. The roller bearing of claim 9, wherein at least one of the pillars defines a tab extending in a circumferential direction concentric with the first annular portion and the second annular portion.

13. The roller bearing of claim 12, wherein at least one of the tabs has the radially outward facing concave roller support surface formed therein.

14. The roller bearing of claim 9, wherein each of the pillars defines at least two tabs extending in a first common circumferential direction concentric with the first annular portion and the second annular portion.

15. The roller bearing of claim 14 wherein each of the pillars defines at least two additional tabs extending in a second common circumferential direction concentric with the first annular portion and the second annular portion, the second common circumferential direction being opposite the first common circumferential direction.

16. The cage of claim 9, wherein a ratio of pocket width variation from a nominal value to a radially inward displacement of the rollers is less than 1.0.

17. A method of manufacturing a cage for a roller bearing, comprising the steps of:
providing the cage having a first annular portion and a second annular portion opposite the first annular portion, a plurality of pillars interconnecting the first annular portion and the second annular portion, the plurality of pillars defining a plurality of pockets for holding rollers, each of the pockets being configured to receive at least one roller,
cutting a radially outward facing concave roller support surface roller support surface in each of the pillars so that a portion of the radially outward facing concave roller support surface of each adjacent pair of pillars face towards each other and each of the portions of the radially outward facing concave roller support surface defines a radially extending edge and a pocket width is defined between the radially extending edges in the pocket, the pocket width being less than two times a diameter of one of the rollers.

18. The method according to claim 17, wherein the cutting the radially outward facing roller support surface in the pillar to form the radius of curvature is milling.

* * * * *